United States Patent
Matsumoto et al.

(10) Patent No.: US 7,209,762 B2
(45) Date of Patent: Apr. 24, 2007

(54) MOBILE RADIO COMMUNICATION SYSTEM AND BASE STATION, AND MOBILE RADIO COMMUNICATION METHOD USED THEREFOR

(75) Inventors: Mariko Matsumoto, Tokyo (JP); Soichi Tsumura, Tokyo (JP); Kojiro Hamabe, Tokyo (JP); Nahoko Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 217 days.

(21) Appl. No.: 10/702,498

(22) Filed: Nov. 7, 2003

(65) Prior Publication Data

US 2004/0127244 A1  Jul. 1, 2004

(30) Foreign Application Priority Data

Nov. 8, 2002  (JP) ............................. 2002-324935

(51) Int. Cl.
*H04B 7/00* (2006.01)
(52) U.S. Cl. ..................................... 455/517; 370/347
(58) Field of Classification Search ............ 455/432.1, 455/450, 560, 502, 457, 451, 452.1; 370/335, 370/342, 336, 347, 351
See application file for complete search history.

(56) References Cited

U.S. PATENT DOCUMENTS

| | | | | |
|---|---|---|---|---|
| 5,875,402 A * | 2/1999 | Yamawaki | .................... | 455/502 |
| 5,878,340 A * | 3/1999 | Asaoka et al. | ............ | 455/432.1 |
| 5,956,329 A * | 9/1999 | Pernice et al. | ............... | 370/336 |
| 6,039,624 A | 3/2000 | Holmes | | |
| 6,101,391 A * | 8/2000 | Ishizuka et al. | ............. | 455/457 |
| 6,438,380 B1 * | 8/2002 | Bi et al. | .................... | 455/456.1 |
| 6,757,270 B1 * | 6/2004 | Kumar et al. | ............... | 370/342 |
| 6,804,520 B1 * | 10/2004 | Johansson et al. | .......... | 455/450 |
| 2002/0002063 A1 * | 1/2002 | Miyamoto et al. | .......... | 455/560 |
| 2003/0002472 A1 * | 1/2003 | Choi et al. | .................... | 370/347 |
| 2003/0039230 A1 * | 2/2003 | Ostman et al. | ............. | 370/335 |
| 2003/0103491 A1 * | 6/2003 | Frederiksen et al. | ........ | 370/351 |
| 2003/0224786 A1 * | 12/2003 | Lee et al. | ................. | 455/432.1 |
| 2004/0085920 A1 * | 5/2004 | Sezgin et al. | ................ | 370/320 |

FOREIGN PATENT DOCUMENTS

| | | |
|---|---|---|
| JP | 2005-324935 | 11/2002 |
| WO | WO 98/05176 | 2/1998 |
| WO | WO 01/ 52589 | 7/2001 |

OTHER PUBLICATIONS

K. Sam Shanmugam: "Digital and Analog Communication Systems", 1985, John Wiley & Sons, NY, XP002268785 ISBN: 0-471-06302-9, p. 456, lines 1-10.
3rd Generation Partnership Project; Technical Specification Group Radio Access Network; High Speed Downlink Packet Access: Physical Layer Aspects (Release 5), Mar. 2002, 3GPP TR 25.858 (Technical Report)"Digital System Automobile Telephone System", First Section, 4-1-10-31.

* cited by examiner

*Primary Examiner*—Duc M. Nguyen
*Assistant Examiner*—Michael Vu
(74) *Attorney, Agent, or Firm*—Young & Thompson

(57) ABSTRACT

There is provided a mobile radio communication system which is capable of reducing a group ID in length with respect to the number of mobile stations and realizing efficiency of air resources. Suspend control of mobile stations is performed by notifying not only control information but also transmission/reception state update information for instructing a state [Active/Suspend] in a status update frame set in advance from a base station to the mobile stations using an HS-SCCH. The base station performs the suspend control by sending, in state update information at timing of a state update frame number of a user ID allocated in advance, a group ID of a user ID allocated to mobile stations desired to be made Active in advance.

81 Claims, 14 Drawing Sheets

FIG. 6

|  | GID | SUF #1 | SUF #2 | SUF #3 | SUF #4 |
|---|---|---|---|---|---|
| IGNORE | 000 |  |  |  |  |
| GID #1 | 111 | (1) |  |  |  |
| GID #2 | 110 | (2) |  |  |  |
| GID #3 | 101 | (3) |  |  |  |
| GID #4 | 011 | (4) |  |  |  |
| GID #5 | 100 | (5) |  |  |  |
| GID #6 | 010 | (6) |  |  |  |
| GID #7 | 101 | (7) |  |  |  |

SUF NUMBER

FIG. 7A | GID#1 | GID#3 | GID#4 | IGNORE | IGNORE | IGNORE |

VARIABLE ID FLAG 1

FIG. 7B | "0" | GID#1 | GID#3 | GID#4 | GID#5 | GID#6 | IGNORE |

"111"

VARIABLE ID FLAG 1

FIG. 7C | "1" | GID#3 | GID#6 | IGNORE |

"110011"

FIG. 7D | GID#1 | GID#3 | GID#6 | IGNORE | NUMBER OF GIDS: 3

FIG. 7E | GID#1 | GID#3 | GID#5 | GID#6 | NUMBER OF GIDS: 4

FIG. 7F | ALL ACTIVE | ALL ACTIVE | ALL ACTIVE | ALL ACTIVE | NUMBER OF GIDS > 4

FIG. 9

SUF NUMBER

| GID | SUF #1 | SUF #2 | SUF #3 | SUF #4 |
|---|---|---|---|---|
| 0 0 | (1) | (15) | (6) | (9) |
| 0 1 | (11) | (3) | (16) | (8) |
| 1 1 | (5) | (10) | (2) | (13) |
| 1 0 | (14) | (7) | (12) | (4) |

FIG. 11

SUF NUMBER

| GID | SUF #1 | SUF #2 | SUF #3 | SUF #4 |
|-----|--------|--------|--------|--------|
| 0 0 | (1) (17) | (5) | (11) | (15) |
| 0 1 | (8) | (4) | (7) | (12) |
| 1 1 | (13) | (10) | (2) (18) | (6) |
| 1 0 | (16) | (14) | (9) | (3) |

MOBILE RADIO COMMUNICATION SYSTEM AND BASE STATION, AND MOBILE RADIO COMMUNICATION METHOD USED THEREFOR

BACKGROUND OF THE INVENTION

1. Field of the Invention

The present invention relates to a mobile radio communication system and a base station, and a mobile radio communication method used therefor, and in particular, to a packet communication method such as an HSDPA (High-Speed Downlink Packet Access) service in the mobile radio communication system.

2. Description of the Related Art

Conventionally, in the HSDPA service, as shown in FIG. 13, DPCHs (Dedicated Physical Channels: individual channels) [DL (Downlink)/UL (Uplink)] are set between a mobile station 102 and a base station 101. In FIG. 13, a base station controller [e.g., RNC (Radio Network Controller)] 103 is connected to the base station 101.

As shown in FIG. 14, the mobile station 102 always receives an HS-SCCH (High Speed Shared Control Channel) of 4 CHs (Channels) designated by the base station 101, detects information on a mobile station ID (Identifier) included in the HS-SCCH, and judges whether the mobile station ID coincides with a mobile station ID of the mobile station 102 itself.

In the case in which the mobile station ID of the mobile station 102 itself is detected in an HS-SCCH, the mobile station 102 uses control information to be sent on the HS-SCCH to receive an HS-PDSCH (High Speed Physical Downlink Shared Channel) which is sent from the HS-SCCH at a predetermined time delay.

In addition, in the case in which data which should be sent on an individual channel (hereinafter referred to as individual channel data) is generated in user data, control information of an higher layer, or the like, the mobile station 102 and the base station 101 send the data immediately using DPCHs (UL/DL) (see 3GPP TR (Technical Report) 25.858 V5.0.0, March 2002).

The above-described HSDPA is a system for performing a high-speed packet transmission on a down line. In an HSDPA service receivable state, a CPICH (Common Pilot Channel), an HS-PDSCH, an HS-SCCH, and a DPCH (DL) are sent on a down line, and an HS-DPCCH (High Speed Dedicated Physical Control Channel) and a DPCH (UL) are sent on an up line.

The CPICH is a pilot signal which is sent to all mobile stations in a cell managed by the base station 101. The CPICH is sent with predetermined power from the base station 101 and is used for path search, estimation of a transmission line, measurement of a receiving quality of DL, and the like. The HS-PDSCH is a shared channel for packet transmission of user data and is used among a plurality of mobile stations in a time-multiplexed manner.

The HS-SCCH is a shared channel for sending control data necessary for receiving a packet sent on the HS-PDSCH and is used among a plurality of mobile stations in a time-multiplexed manner. Each mobile station always receives one or more HS-SCCHs. If the HS-SCCH(s) is directed to the mobile station itself, the mobile station receives a packet of the HS-PDSCH using control information of the HS-SCCH.

The DPCHs (DL/UL) consist of a DPCCH (Dedicated Physical Control Channel: individual control channel) and a DPDCH (Dedicated Physical Data Channel: individual data channel).

On the DPCCH, a TPC (Transmit Power Control) bit, which is transmission power control information of channels to be a pair, and control information of a physical layer such as TFCI (Transport Format Combination Indication: transmission format information),and the like indicating a structure of the DPDCH are sent. On the DPDCH, user data and individual channel data, which is a signal of a higher layer, are sent.

The HS-DPCCH is an individual channel which sends CQI (Channel Quality Indication: down line quality information) determined from a result of quality measurement of the CPICH and ACK/NACK (Acknowledgement/Negative Acknowledgements) which is acknowledgement information of a received packet.

In the packet communication method, mobile stations are classified into groups, the number of which is peculiar to each cell, from an MSI peculiar to each mobile station. Transmission and reception of data such as the control information or the like are performed between the mobile stations and the base station using group IDs of the groups (e.g., see "Digital System Automobile Telephone system, First Section, 4-1-10-3, Designation of Channel Structure" ARIB (Association of Radio Industries and Businesses) RCR STD-27 (revised in May 2002)).

In the conventional packet communication method, since an ID allocated to a mobile station is peculiar to a terminal, group ID (GID) resources cannot be utilized effectively depending upon a connection state.

SUMMARY OF THE INVENTION

Thus, it is an object of the present invention to eliminate the above-described problems, and provide a mobile radio communication system and a base station, and a mobile radio communication method used therefor which can reduce a group ID in length with respect to the number of mobile stations and can realize efficiency of air resources.

A mobile radio communication system according to the present invention is a mobile radio communication system which performs transmission and reception of control information and data between a base station and mobile stations, wherein the mobile radio communication system includes, in the base station, means which temporarily allocates user identification information, which consists of a code sequence and timing information for notifying the mobile stations of the code sequence, to the mobile stations.

In the above-described constitution, in another mobile radio communication system according to the present invention, the base station allocates the user identification information to the mobile stations when the mobile stations move into a cell managed by the base station itself.

In addition to the above-described constitution, another mobile radio communication system according to the present invention includes, in the base station, means which notifies the mobile stations of transmission/reception status update information, which indicates update of a status concerning whether or not reception of the packet in the mobile stations is possible, executes suspend control for setting a connection status to one of an active state, in which reception of the packet is possible in the mobile stations, and a suspend state, in which reception of packet is impossible in the mobile stations, on the basis of the transmission/reception status update information, and allocates the user identification information of mobile stations to be objects of the suspend control to the transmission/reception status update information.

The base station according to the present invention is a base station which performs transmission and reception of control information and data between the base station and mobile stations. The base station includes means which temporarily allocates user identification information, which consists of a code sequence and timing information for notifying the mobile stations of the code sequence, to the mobile stations.

In the above-described constitution, another base station according to the present invention allocates the user identification information to the mobile stations when the mobile stations move into a cell managed by the base station itself.

In addition to the above-described constitution, another base station according to the present invention includes means which notifies the mobile stations of transmission/reception status update information indicating updates of a status concerning whether or not reception of the packet in the mobile stations is possible, executes suspend control for setting a connection status to one of an active state, in which reception of the packet is possible in the mobile stations, and a suspend state, in which reception of packet is impossible in the mobile stations, on the basis of the transmission/reception status update information, and allocates the user identification information of mobile stations to be objects of the suspend control to the transmission/reception status update information.

A mobile radio communication method according to the present invention is a mobile radio communication method which performs transmission and reception of control information and data between a base station and mobile stations, wherein the base station temporarily allocates user identification information, which consists of a code sequence and timing information for notifying the mobile stations of the code sequence, to the mobile stations.

In the above-described operation, in another mobile radio communication method according to the present invention, the base station allocates the user identification information to the mobile stations when the mobile stations move into a cell managed by the base station.

In addition to the above-described operation, another mobile radio communication method according to the present invention notifies transmission/reception status update information, which indicates update of a status concerning whether or not reception of the packet in the mobile stations is possible, to the mobile stations from the base station, executes suspend control for setting a connection status to one of an active state, in which reception of the packet is possible in the mobile stations, and a suspend state, in which reception of packet is impossible in the mobile stations, on the basis of the transmission/reception status update information, and allocates the user identification information of mobile stations to be an object of the suspend control to the transmission/reception status update information.

In sending transmission/reception status update information (SUS: Status Update Signaling) (hereinafter referred to as status update information) of suspend control of HSDPA (High-Speed Downlink Packet Access), a first mobile radio communication system of the present invention reads out an ID (identification information) allocated to each mobile station in the suspend control for a mobile stations according to a group ID (GID) (code sequence) used for the status update information and a status update frame (SUF) number (timing information notifying mobile stations of group IDs). In this case, the mobile radio communication system uses a user ID consisting of a group ID with the number of bits smaller than that of each mobile station ID [UE (User Equipment) ID], which is allocated in advance at the time of movement to a cell of each base station, and a status update frame number. Consequently, in the mobile radio communication system of the present invention, IDs of mobile stations are simplified and air resources are utilized effectively. As a result, low power consumption of the mobile stations is realized.

In this case, in the first mobile radio communication system of the present invention, an order of allocation of a group ID to be allocated to each terminal, that is, an order (descending order or ascending order) of group IDs on status update information is decided in advance. If, in a mobile station, a group ID of the mobile station itself is skipped, the mobile station neglects information after the group ID. In other words, at timing of a status update frame number of a user ID allocated to the mobile station itself, the mobile station confirms whether or not a group ID of the user ID exists, and performs the suspend control if the group ID exists and does not perform the suspend control if the group ID does not exist.

In judging whether the group ID exists or not, if the group ID of the mobile station itself is skipped, that is, if a group ID located in a later stage (a smaller group ID in case of the descending order or a larger group ID in case of the ascending order) is confirmed before the group ID of the mobile station itself is confirmed, the mobile station stops judgment of the group ID after confirmation of the group ID. Then, the mobile station judges that the group ID does not exist, and does not perform the suspend control.

Here, the suspend control means control for bringing a mobile station into an active state or a suspend state. Active is a status for allowing the mobile station to receive an ordinary HSDPA, that is, to receive control information necessary for packet transmission. This is a state in which power supplies to all circuits are ON. In addition, Suspend is a state prohibiting the mobile station from receiving an HSDPA. In this state, the mobile station is in a power consumption reduction mode in which a power supply to a circuit relating to reception of an HSDPA is turned OFF.

Moreover, in the first mobile radio communication system of the present invention, "IGNOR" (a code indicating that there is no group ID in status update information after the code) is provided in a group ID. Group IDs are allocated in order from one with a largest distance from IGNORE. For example, there is a method of allocating group IDs preferentially from ID "111" with a largest distance from "000" assuming that a group ID "000" indicates "IGNORE". In that case, all group IDs after "IGNORE" in the status update information are assumed to be "IGNORE".

A second mobile radio communication system of the present invention uses the timing of each group ID for the suspend control in a status update frame and status update information. In this case, the mobile radio communication system does not only use timing information of the status update frame but also includes active/suspend information in the timing for each group ID designated in advance in the status update information and performs the suspend control at timing of a user ID. In other words, each group ID is allocated to a fixed position (timing) for each status update frame. A mobile station confirms information (active/suspend information) of the fixed position (timing) to perform the suspend control.

In addition, in the second mobile radio communication system of the present invention, it is also possible to include ON/OFF information instead of the active/suspend information. In this case, presence/absence of call with respect to each mobile station is not indicated by a group ID, and as the indication thereof, the ON/OFF information is represented by "000", "111". Assuming that time information is less likely to be wrong, the ON/OFF information is less likely to be wrong because the information consists of three bits.

A third mobile radio communication system of the present invention is provided with Variable ID Flag 1 (a flag specifying the number of bits to be used for one group ID in status update information) ("000": short, "111": long) to notify the number of bits of the group ID to thereby make a length (number of bits) of a group ID variable. In this case, if the number of group IDs to be transmitted is small, the length (number of bits) of the group ID is "long" and increased to repeat each code of the group ID. As a result, reliability of the status update information is improved.

In the case in which an ID cannot be allocated to a mobile station according to the user ID (group ID+status update frame number), a fourth mobile radio communication system of the present invention duplicately allocates the same ID to different mobile stations. Thereafter, the mobile radio communication system sends an ID peculiar to the mobile station, which is set in advance in control information, again, whereby it becomes possible for the mobile station to specify whether or not a message is directed to the mobile station itself.

In this case, in the same manner as the above-described processing, an order of duplicate allocation of a group ID to be allocated to each mobile station, that is an order (descending order, ascending order) of group IDs on status update information is determined in advance. If a group ID of the mobile station itself is skipped in a mobile station, the mobile station neglects information after the group ID of the mobile station itself.

In addition, in the case in which a group ID is duplicately allocated, a base station increases the number of bits of the group ID according to Variable ID Flag 2 (a flag specifying the number of bits to be used for one group ID in status update information in the case in which the number of group IDs is increased at the time of duplicate allocation of a group ID) and allocates the group ID. In the status update information, the base station reduces the group ID in length (initial value) if the number of group IDs to be transmitted is large, increases the group ID in length if the number of group IDs to be transmitted is small, and sends all the group IDs increased in number by the duplication.

When it is assumed that a group ID consists of four bits and a status update information region consists of twenty bits, a fifth mobile radio communication system of the present invention displays each group ID in the case in which the number of group IDs, which is desired to be made Active, is three or less, makes mobile stations All active (a code meaning that all mobile stations designated by all group IDs, which are likely to be called, in status update information) in the case in which the number of group IDs is more than three.

A sixth mobile radio communication system of the present invention uses Fixed Number Flag (a flag representing whether the number of group IDs to be sent in status update information is larger than the number of group IDs defined in advance) to indicate whether or not the number of group IDs to be called in the status update information is larger than a predetermined number decided in advance. Thus, the mobile radio communication system improves likelihood in judging Active/Suspend of a group ID.

When it is assumed that the predetermined number is 1 in the Fixed Number Flag, the flag indicates whether or not mobile stations are All Suspend (a code meaning that all mobile stations designated by all group IDs, which are likely to be called, in status update information is made Suspend).

As described above, in the present invention, it becomes possible to combine a group ID and a status update frame number in a user ID for specifying respective mobile stations by using a temporarily allocated user ID and allocating group IDs to be used to the user ID temporarily. Therefore, it becomes possible to further reduce the group ID in length with respect to the number of mobile stations, and it becomes possible to realize efficiency of air resources compared with the case in which an ID peculiar to a mobile station is used for notifying the mobile station of status update information.

BRIEF DESCRIPTION OF THE DRAWINGS

FIG. 6 is a diagram showing an example of allocation of mobile station IDs to group IDs and status update frames according to the GID allocation section of FIG. 3;

FIGS. 7A to 7F are schematic diagrams showing a designation method of a group ID in the status update information at the time of suspend control according to the first embodiment of the present invention;

FIG. 9 is a schematic diagram for explaining an allocation order of group IDs and status update frame numbers in the first embodiment of the present invention;

FIG. 11 is a schematic diagram for explaining duplicate allocation in the first embodiment of the present invention;

DETAILED DESCRIPTION OF THE PREFERRED EMBODIMENTS

Figure 1:
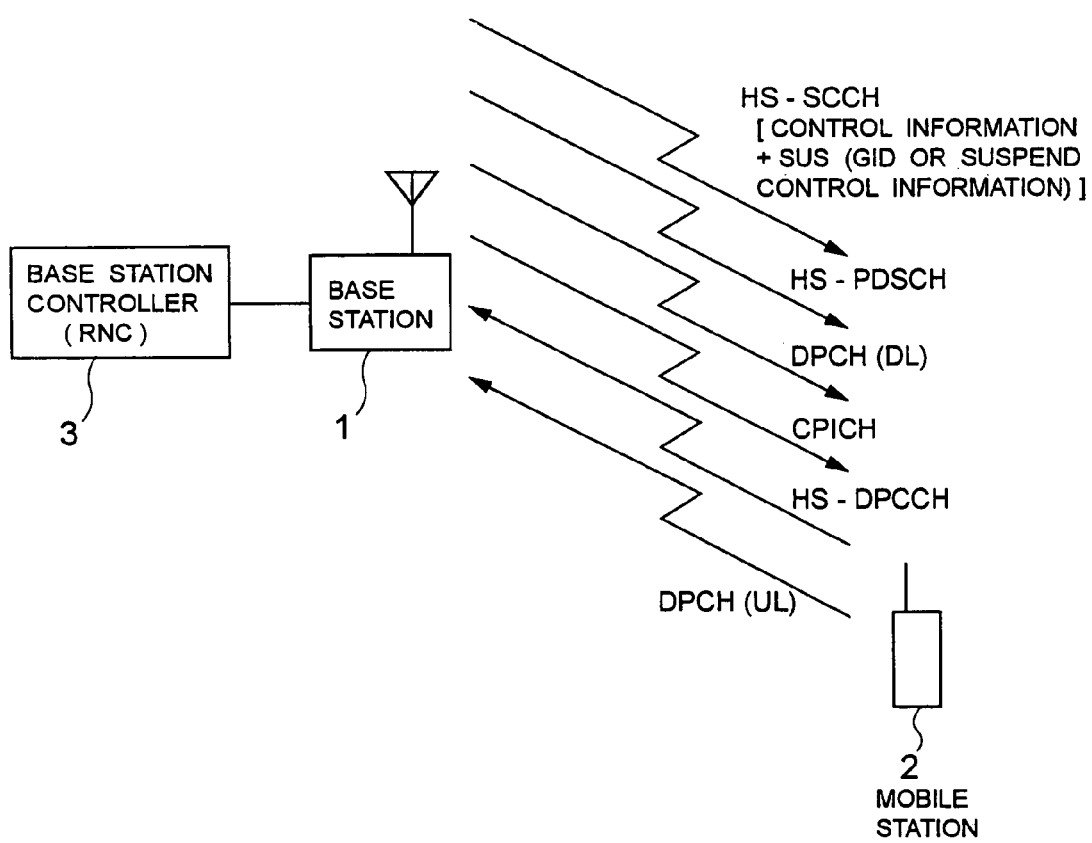
FIG. 1 is a block diagram showing a structure of a mobile radio communication system according to an embodiment of the present invention.

Next, an embodiment of the present invention will be described with reference to the accompanying drawings. FIG. 1 is a block diagram showing a structure of a mobile radio communication system according to an embodiment of the present invention. In FIG. 1, the mobile radio communication system according to the embodiment of the present invention includes a base station 1, a mobile station 2, and a base station controller [e.g., RNC (Radio Network Controller)] 3.

Figure 2:
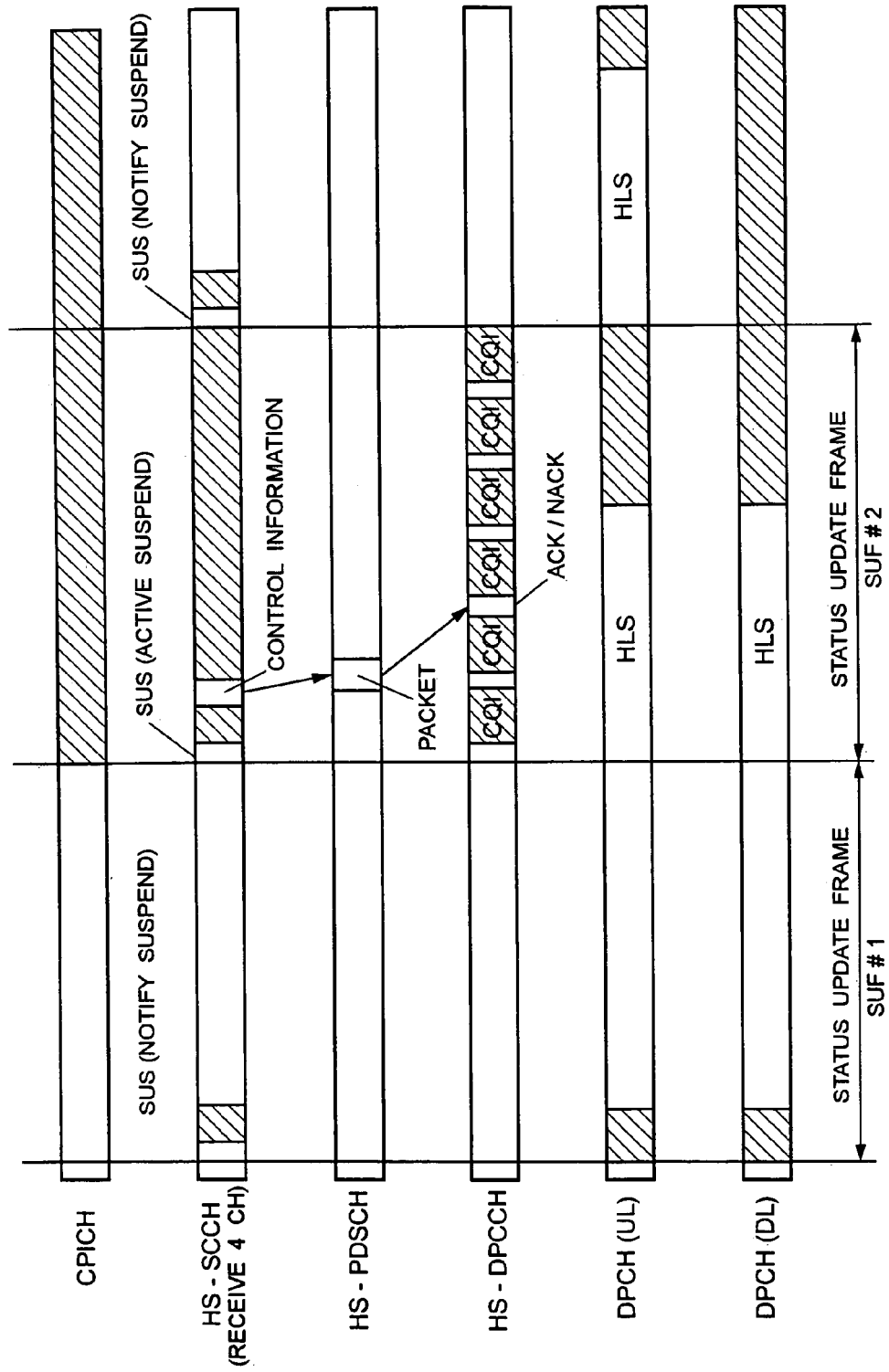
FIG. 2 is a diagram showing a flow of signals sent and received between a base station and a mobile station of FIG. 1.

FIG. 2 is a diagram showing a flow of signals sent and received between the base station 1 and the mobile station 2 of FIG. 1. An operation of the mobile radio communication system according to the embodiment of the present invention will be described with reference to FIGS. 1 and 2. In this embodiment, only in the case in which a packet has arrived, a status is designated as Active in a transmission/reception status update information [a signal notifying a state in a present status update frame (SUF) of the mobile station 2] (hereinafter referred to as status update information) (SUS: Status Update Signaling). In the case in which individual channel data [indicated as HLS (Higher Layer Signaling) in FIG. 2] exists, although a state is Suspend, only transmission and reception of a DPCH (Dedicated Physical Channel: individual channel) are continued from the head of the status update frame.

When the mobile station 2 moves into a cell managed by the base station 1, a user ID consisting of a group ID (GID) (code sequence), which has a smaller number of bits than the number of bits of each mobile station ID [UE (User Equipment) ID], and a status update frame number (timing information for notifying a mobile station of a group ID) is given to the mobile station 2 by the base station 1.

The mobile station 2 always receives an HS-SCCH (High Speed Shared Control Channel) of 4 CHs (Channels) designated by the base station 1, and uses control information sent on this HS-SCCH to receive an HS-PDSCH (High Speed Physical Downlink Shared Channel) which is sent from the HS-SCCH at predetermined time delay.

In this embodiment, not only the above-described control information but also transmission/reception status update information for designating a status [Active/Suspend] in a status update frame (e.g., a section frame performing status control of the mobile station 2 with 100 sec as a period) (a signal notifying a status in a present status update frame of the mobile station 2) (hereinafter referred to as status update information) is notified from the base station 1 to the mobile station 2. The status update information includes a group ID or suspend control information of the user ID, and the mobile station 2 performs the suspend control on the basis of those pieces of information.

Here, the suspend control means control for bringing the mobile station 2 into an active state or a suspend state. Active is a state for allowing a mobile station to receive an ordinary HSDPA (High-Speed Downlink Packet Access), that is, allowing a mobile station to receive control information necessary for packet transmission. This is a state in which power supplies to all circuits are ON. In addition, Suspend is a state prohibiting a mobile station from receiving an HSDPA. In this state, the mobile station is in a power consumption reduction mode in which a power supply to a circuit relating to reception of an HSDPA is turned OFF.

Therefore, in the mobile station 2, on the basis of status update information sent from the base station 1 at a period set in advance (predetermined interval), a state (mode) in a status update frame thereof is set. Thus, the mobile station 2 comes into the suspend state at times other than reception of a packet and transmission and reception of user data and data which should be sent on an individual channel in control information of an higher layer, or the like (hereinafter referred to as individual channel data) [control information of a layer higher than L1 (Layer) (various kinds of control information such as an application, channel change, and handover)]. Consequently, in the case in which data transmission is requested, the mobile station 2 can perform packet transmission promptly while reducing power consumption in a standby status for a packet.

The base station 1 performs the suspend control by sending a group ID of a user ID allocated in advance to the mobile station 2, which is desired to be made Active, in status update information to be sent at timing of a status update frame number of the user ID allocated in advance.

Figure 3:
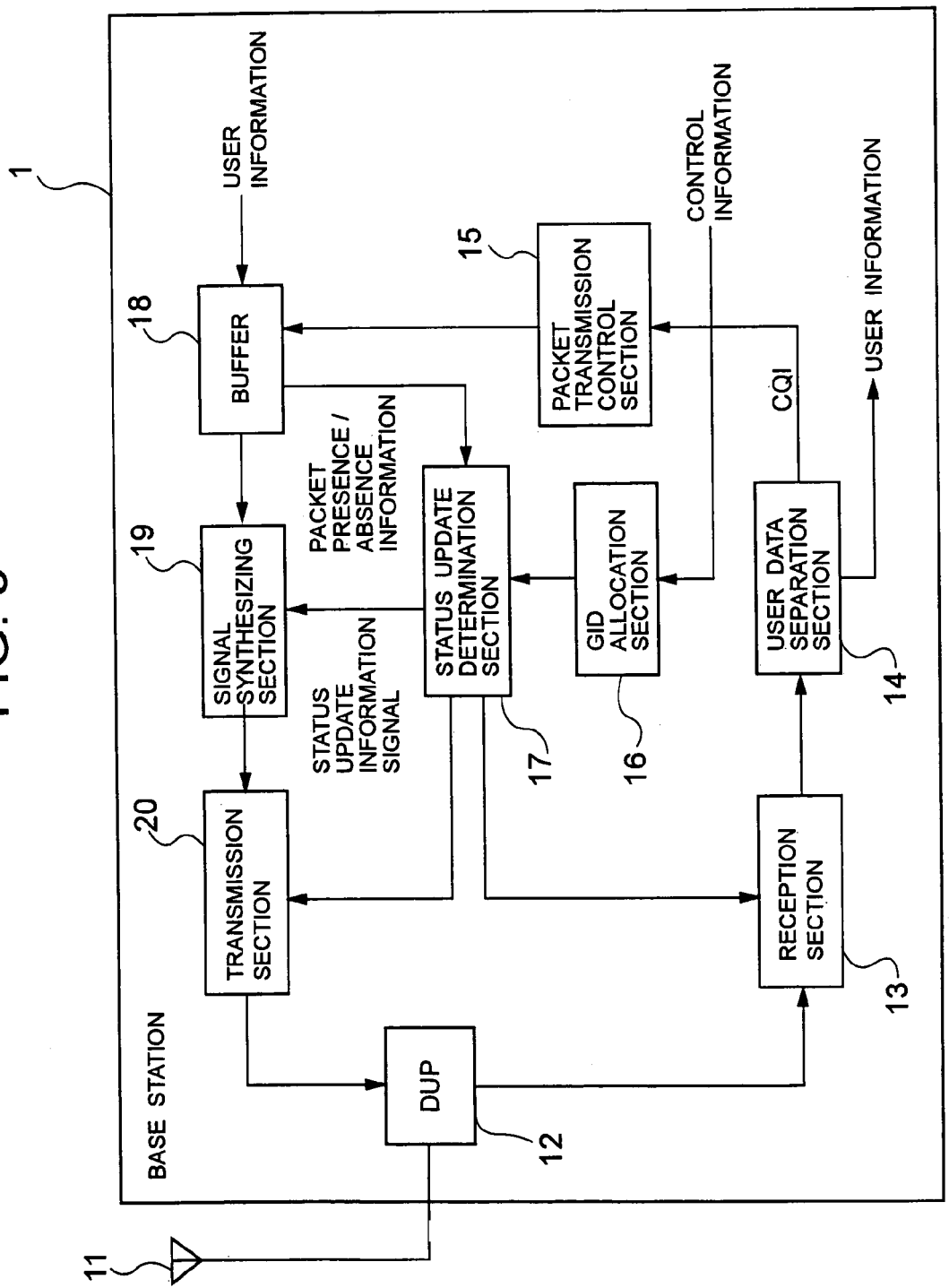
FIG. 3 is a block diagram showing a structure of a base station according to a first embodiment of the present invention.

FIG. 3 is a block diagram showing a structure of a base station according to the first embodiment of the present invention. In FIG. 3, the base station 1 includes an antenna 11, a duplexer (DUP) 12, a reception section 13, a user data separation section 14, a packet transmission control section 15, a GID allocation section 16, a state update determination section 17, a buffer 18, a signal synthesizing section 19, and a transmission section 20. Note that publicly known techniques are applicable to a call control portion, a voice input/output portion, and a display portion of the base station 1, a description for components and operations of the sections will be omitted.

The reception section 13 sends a signal [DPCH (UL), etc.], which is received via the antenna 11 and the duplexer 12, to the user data separation section 14. The user data separation section 14 separates a reception signal from the reception section 13 into user information (a voice signal, an image signal, etc.) and control information [CQI (Channel Quality Indication: down line quality information) information, etc.]. Then, the user data separation section 14 sends the user information to the call control portion, the voice input/output portion, and the display portion of the base station 1, and sends the control information to the packet transmission control section 15.

The packet transmission control section 15 performs transmission control of a packet, which is temporarily stored in the buffer 18, on the basis of CQI information from the user data separation section 14 and active mobile station information from the status update determination section 17. The GID allocation section 16 allocates the group ID of the user ID to each mobile station 2 according to a method described later on the basis of the control information, and notifies the group ID to the status update determination section 17.

The status update determination section 17 determines, on the basis of presence or absence information of the packet temporarily stored in the buffer 18, whether the mobile station 2 is brought into the active state or the suspend state. According to a result of the determination, the state update determination section 17 sends active mobile station information, a state update information signal (status update information sent to the mobile station 2), and an individual channel transmission/reception ON/OFF signal to the packet transmission control section 15, the signal synthesizing section 19, and the reception section 13 and the transmission section 20, respectively. The processing, which is performed by the status update determination section 17 to bring the mobile station 2 into the active state or the suspend state, will be hereinafter referred to as suspend control.

The buffer 18 temporarily stores user information (packet). The signal synthesizing section 19 synthesizes the user information (packet) temporarily stored in the buffer 18 and a status update information signal or the like from the status update determination section 16 to form an HS-SCCH, a DPCH (DL), or an HS-PDSCH. Then, the signal synthesizing section 19 sends it from the antenna 11 via the transmission section 20 and the duplexer 12.

Figure 4:
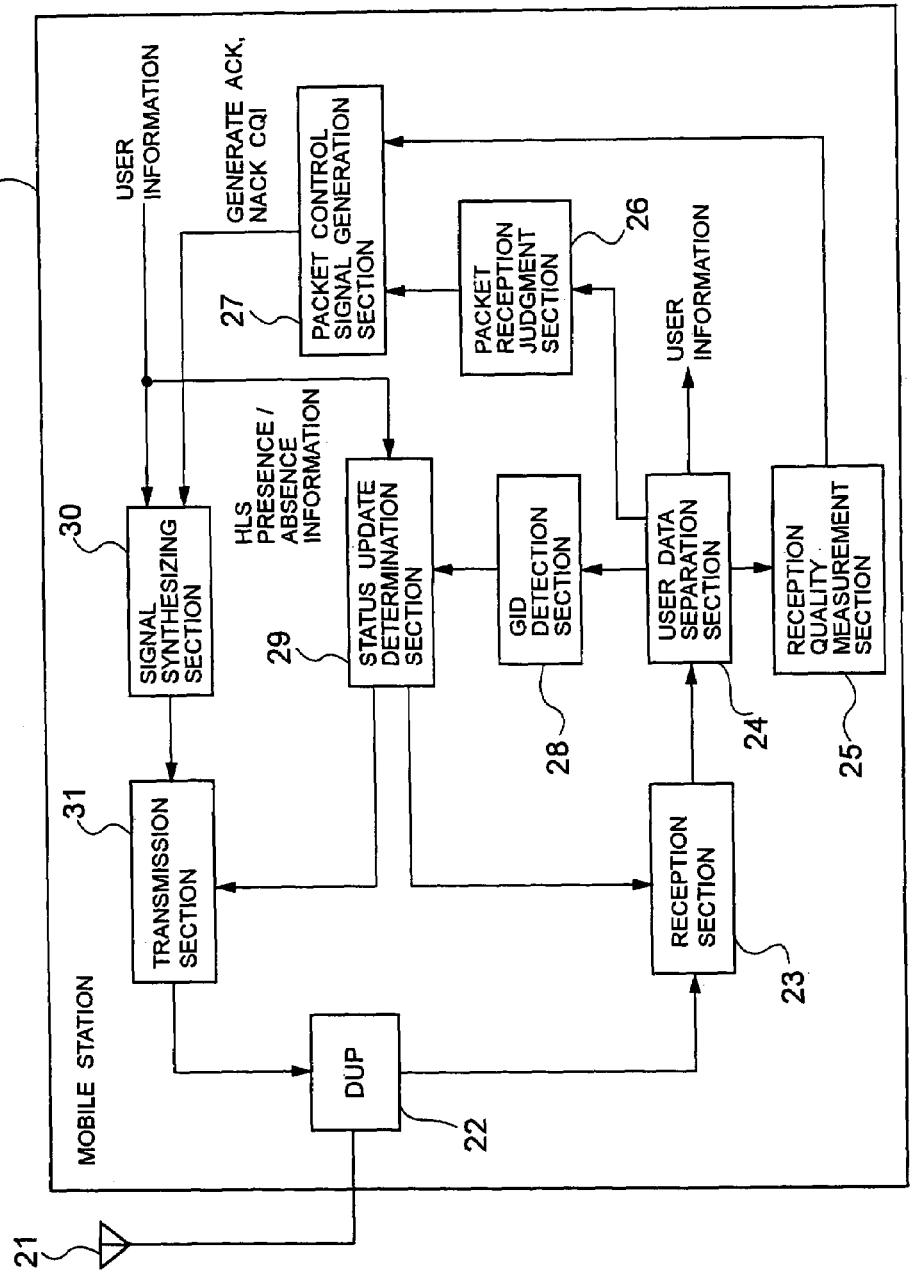
FIG. 4 is a block diagram showing a structure of a mobile station according to the first embodiment of the present invention.

FIG. 4 is a block diagram showing a structure of a mobile station according to the first embodiment of the present invention. In FIG. 4, the mobile station 2 includes an antenna 21, a duplexer (DUP) 22, a reception section 23, a user data separation section 24, a reception quality measurement section 25, a packet reception judgment section 26, a packet control signal generation section 27, a GID detection section 28, a status update determination section 29, a signal synthesizing section 30, and a transmission section 31. Note that publicly known techniques are applicable to a call control portion, a voice input/output portion, and a display portion of the mobile station 2, a description for components and operations of the sections will be omitted.

The reception section 23 sends a signal [CPICH (Common Pilot Channel), DPCH (DL), or HS-PDSCH], which is received via the antenna 21 and the duplexer 22, to the user data separation section 24. The user data separation section 24 separates a reception signal from the reception section 23 into user information (a voice signal, an image signal, etc.) and control information. Then, the user data separation section 24 sends the user information to the call control portion, the voice input/output portion, and the display portion of the mobile station 2, respectively, and sends the control information to the packet reception judgment section 26 and the GID detection section 28, respectively.

The reception quality measurement section 25 measures a reception quality [Ec/Io(energy per a chip/interference wave power per a section frequency)] of the CPICH from the reception section 23 and outputs a result of the measurement to the packet control signal generation section 27. The packet reception judgment section 26 judges presence or absence of control information (a signal for notifying transmission timing of a packet) of an HS-SCCH or whether or not a packet from the base station 1 has been received normally on the basis of the control information from the user data separation section 24. Then, the packet reception judgment section 26 outputs a result of the judgment to the packet control signal generation section 27.

The packet control signal generation section 27 generates ACK/NACK (Acknowledgement/Negative Acknowledgements), which is acknowledgment information of the received packet, on the basis of the judgment result from the packet receipt judgment section 26 and CQI information based upon the measurement result from the receipt quality measurement section 25, and sends them to the signal synthesizing section 30. The GID detection section 28 detects whether or not a group ID of its own terminal exists in the control information from the user data separation section 24, and notifies the status update determination section 29 of a result of the detection.

When the group ID of the own terminal is detected in the GID detection section 28, the status update determination section 29 determines a status (Active/Suspend) in a status update frame on the basis of the control information from the user data separation section 24 and information on presence or absence of individual channel data in user information to be inputted to the signal synthesizing section 30. Then, the status update determination section 29 sends the status to the reception section 23 and the transmission section 31.

The signal synthesizing section 30 synthesizes the information (ACK/NACK, CQI) from the packet control signal generation section 27 and an input signal or the like from the outside such as the call control portion or the voice input/output portion of the mobile station 2 to form a DPCH (UL) or an HS-DPCCH. Then, the signal synthesizing section 30 sends it from the antenna 21 via the transmission section 31 and the duplexer 22.

Figure 5A:
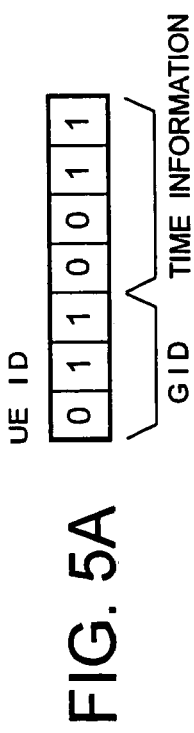
FIGS. 5A and 5B are diagrams showing a method of allocating a mobile station ID to a group ID and a status update frame with a GID allocation section of FIG. 3.
Figure 5B:
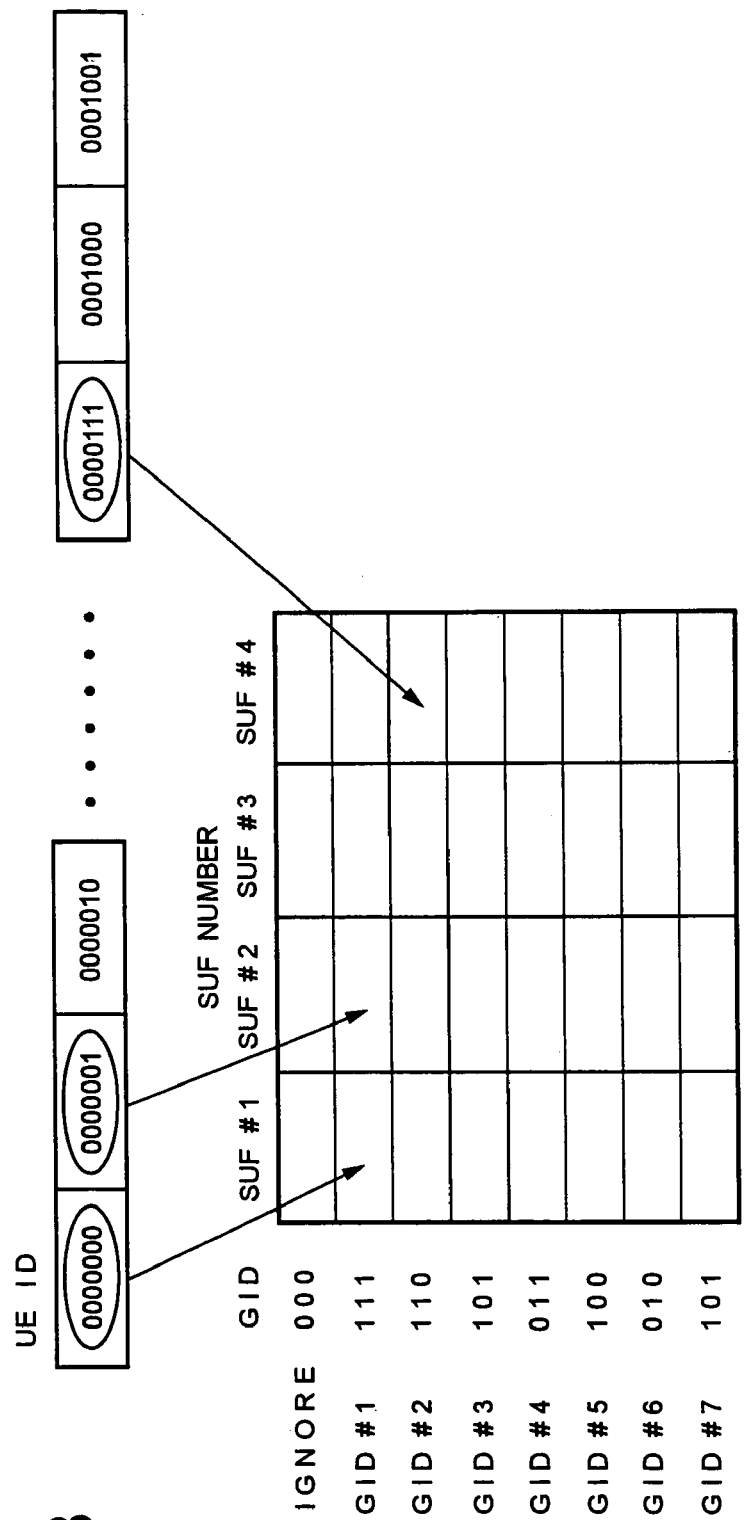

FIGS. 5A and 5B are diagrams showing a method of allocating a user ID to a group ID and a status update frame with the GID allocation section 16 of FIG. 3. FIG. 6 is a diagram showing an example of allocation of mobile station IDs to group IDs and status update frames with the GID allocation section 16 of FIG. 3. A method of allocating a user ID to a group ID and a status update frame with the GID allocation section 16 will be described with reference to FIGS. 5A and 5B and FIG. 6.

In the case in which the status update determination section 29 sends information on Active/Suspend to each mobile station, a user ID of seven bits allocated for each mobile station is divided into a group ID consisting of MSB (Most Significant Bit) three bits and LSB (Least Significant Bit) four bits ("0000", "0001", "0010", . . . ) [see FIG. 5A]. Here, status update frame numbers (SUF#1, SUF#2, SUF#3, SUF#4, . . . ) on a time axis are allocated to the LSB four bits, respectively.

In addition, a box in the upper part of FIG. 5 indicates mobile stations to which mobile station IDs "0000000" to "1111111" are allocated. A matrix in the lower part of the figure indicates allocation of group IDs and status update frame numbers.

In this case, the base station 1 sets a group ID "000" as IGNORE (a code meaning that there is no group ID after the code in status update information) and allocates group IDs to mobile stations one after another from a group ID#1 "111" which is most distant from this IGNORE.

In addition, in an example shown in FIG. 6, when a mobile station (1) is allocated to GID#1 ("111") of SUF#1, mobile stations (2) to (7) following it are allocated to GID#2 ("110"), GID#3 ("101"), GID#4 ("011"), GID#5 ("100"), GID#6 ("010"), and GID#7 ("001") of SUF#1, respectively. In this case, (1) to (7) indicate an order in which the mobile stations 2 move into the cell of the base station 1.

Note that, when all GIDs of SUF#1 are allocated to the mobile station 2, GIDs of SUF#2 are allocated to the mobile station 2. In this case, a code sequence is allocated in the ascending order as group IDs. However, the code sequence may be allocated in the descending order or may be allocated in the order of SUF#1 to SUF#4 of GID#1, that is, an group ID may be allocated in an order of status update frame numbers (order of timing information).

FIGS. 7A to 7F and FIGS. 8A to 8E are schematic views showing a method of designating an group ID in status update information at the time of suspend control according to the first embodiment of the present invention. The suspend control according to the first embodiment of the present invention will be described with reference to FIGS. 1 to 8E.

FIG. 7A shows an example of use of IGNORE. In FIG. 7A, after making GID#1, GID#3, and GID#4 Active, IGNORE is sent. This means that no GID is called. For example, a mobile station to which GID#6 is allocated does not have to see information of group IDs on or after IGNORE.

In addition, by specifying that a transmission order of group IDs is the ascending order, upon receiving GID#3 after GID#1, a mobile station to which GID#2 is allocated does not have to see information after GID#3.

FIGS. 7B and 7C shows an example of use of the Variable ID Flag 1 (a flag specifying the number of bits used for one group ID in status update information) ("000": short, "111": long). Here, in the Variable ID Flag 1, "000" indicates that the number of bits used for one group ID is three (see FIG. 7B), and "111" indicates that the number of bits used for one group ID is six (see FIG. 7C). In the case of six bits, the group ID (three bits) is repeated to form one group ID.

In an example shown in FIG. 7B, the Variable ID Flag 1 is "0", the number of group IDs in status update information is five, and each group ID is sent with three bits. In an example shown in FIG. 7C, since the number of group IDs in status update information is small, the Variable ID Flag 1 is set to "1", and a group ID is represented with six bits. In this case, GID#3 "101" is repeated to send a group ID as "110011", whereby resistance against noise is increased.

FIGS. 7D to 7F shows a method of use of All active (a code meaning that all mobile stations designated by all group ID, which are likely to be called, in status update information are made Active).

For example, a group ID of "11111" is allocated as a code of "All_active". This is an example in the case in which one status update information consists of twenty bits and a group ID consists of five bits.

In the case in which the number of group IDs to be made Active is three in one status update information, as shown in FIG. 7D, a part remaining after sending the respective group IDs is filled with IGNORE. In the case in which the number of group IDs to be made Active is four, as shown in FIG. 7E, all effective bits are filled with group IDs.

As shown in FIG. 7F, in the case in which the number of group IDs to be made Active is more than four, since a group ID cannot be sent, All active is sent to all the bits. In this case, all mobile stations to which group IDs of the mobile stations (group IDs allocated to the mobile stations) are likely to be sent in this status update information are made Active.

Figure 8A:
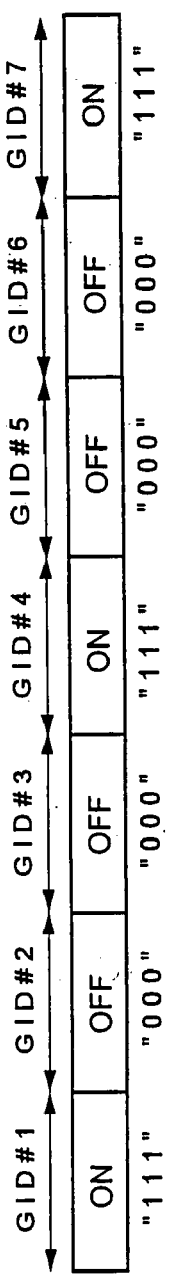
FIGS. 8A to 8E are schematic diagrams showing a designation method of a group ID in the status update information at the time of suspend control according to the first embodiment of the present invention.

FIG. 8A shows an example for applying suspend control to a mobile station at fixed timing associated with user IDs of respective mobile stations (timing specified by status update frame numbers and group IDs) in the case in which a group ID is allocated by a section of predetermined bits of status update information for each status update frame number.

In this case, other than simply using timing information of a status update frame, as shown in FIG. 8A, active/suspend information is included in timing for each group ID designated in advance in the status update information to apply the suspend control to the mobile station IDs. In the case in which Active/Suspend is represented by "000", "111", Active is written as "ON" and Suspend is written as "OFF". Assuming that time information is less likely to be wrong, each piece of information is less likely to be wrong because the information is repetition of three bits.

Figure 8B:
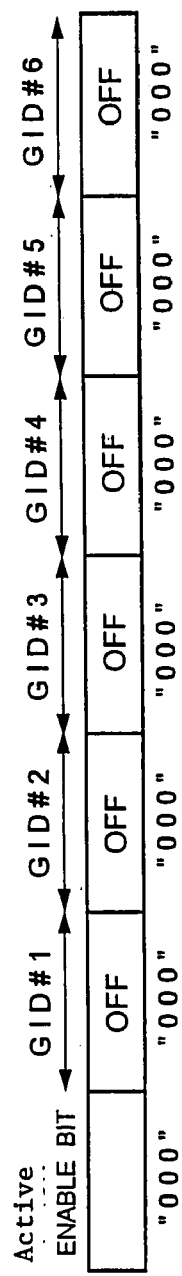
Figure 8C:
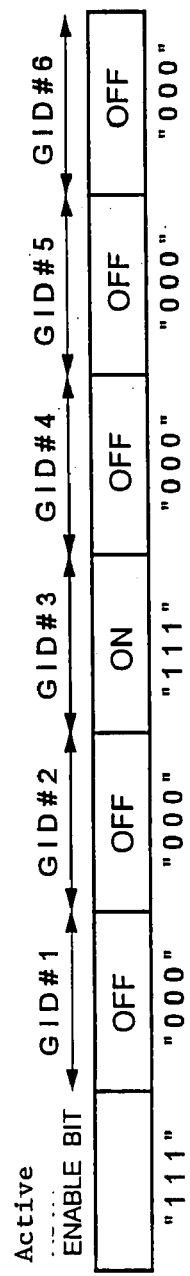

FIGS. 8B and 8C are schematic diagrams for explaining a method of use of Active enable bit (indicating whether a group ID designated as Active exists in status update information).

Active enable bit="000" means that all group IDs in the status update information are made Suspend (OFF). Thus, although GID#3 is "010" due to an influence of a transmission line, a mobile station can judge this as OFF [see FIG. 8B].

On the other hand, Active enable bit="111" means that any one group ID in the status update information is Active (ON). Thus, although GID#3 is "010" due to an influence of a transmission line, a mobile station can judge this as ON [see FIG. 8C].

In this way, in this embodiment, even if an error occurs in information on a group ID corresponding to the mobile station itself on a transmission line, since it is indicated by Active enable bit whether or not a group ID designated as Active exists in the status update information, the mobile station can distinguish Active/Suspend correctly. Thus, an information quality in the case in which information transmission is hindered by a transmission line can be improved.

Figure 8D:
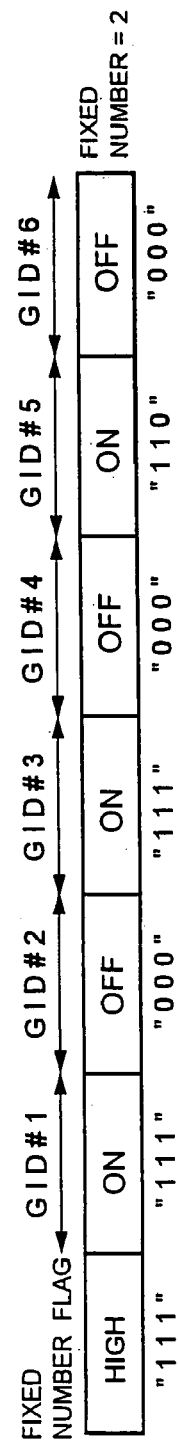
Figure 8E:
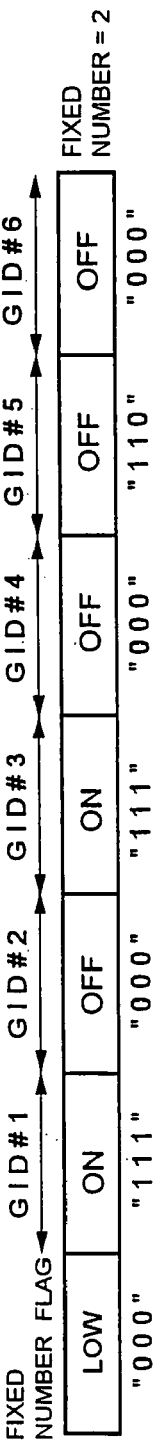

FIGS. 8D and 8E are schematic diagrams for explaining a method of use of Fixed Number Flag (a flag indicating whether the number of group IDs to be sent is larger or smaller in status update information than the number of group IDs defined in advance). Here, it is assumed that Fixed Number is two.

Fixed Number Flag="111" means that the number of group IDs in the status update information is larger than Fixed Number. Thus, although GID#5 is "010" in FIG. 8D, a mobile station can judge this as ON.

On the other hand, Fixed Number Flag="1000" means that the number of group IDs in the status update information is equal to or smaller than Fixed Number. Thus, although GID#5 is "010" in FIG. 8E, a mobile station can judge this as OFF.

In this case, as in the above description, even if an error occurs in information on a group ID corresponding to the mobile station itself on a transmission line, since it is indicated by Fixed Number Flag whether or not the number of group IDs to be sent to the status update information is larger than that of the predetermined group IDs, the mobile station can judge Active/Suspend correctly. Thus, an information quality in the case in which information transmission is hindered by a transmission line can be improved.

FIG. 9 is a schematic diagram for explaining an order of allocating group IDs and status update frame numbers in the first embodiment of the present invention. The figure shows a method of, in the case in which the status update frame number and the group IDs are allocated to the mobile station 2 to which the base station 1 is connected wirelessly, allocating the status update frame numbers and the group IDs from those with largest intercede distance and time distance of group IDs.

In FIG. 9, when it is assumed that (1) is allocated first. Then, if a most distant code is considered for the group ID, "11" is most distant from "00" with a code distance "2". In the case in which SUF#1 follows SUF#4, SUF#3 is most distant as the status update frame number. As in the above description, since (2) has a most distant time code distance of "4", which is found by adding up the intercede distance and the time distance. Thus, (2) is allocated after (1).

After (1) and (2) are filled, (3) and (4) have a code distance "1" and a time distance "1", respectively, with respect to the group ID and the status update frame already filled. Thereafter, although there is no other way but to allocate one in which any one of the conditions is the same, (5), (6), (7), and (8) are distant.

For example, (5) has a time distance "0" and a code distance "2" with respect to (1), has a time distance "1" and a code distance "1" with respect to (3), and has a time distance "2" and a code distance "0" with respect to (2).

When compared, (11) has a time distance "0" and a code distance "1" with respect to (1), has a time distance "1" and a code distance "0" with respect to (3), and has a time distance "2" and a code distance "1" with respect to (2). The remaining (9), (10), (11), (12), (13), (14), (15), and (16) are the same in terms of distance, these may be allocated in any order.

In short, the order is set as one of the following:

[(1), (2)]→[(3), (4)]→[(5), (6), (7), (8)]→[(9), (10), (11), (12), (13), (14), (15), (16)] and

[(3), (4)]→[(1), (2)]→[(5), (6), (7), (8)]→[(9), (10), (11), (12), (13), (14), (15), (16)].

In this way, the group IDs are allocated from one having an intercede distance and a time distance which are not close. Note that the above (1) to (16) indicate a frame specified by GIDs and SUFs#1 to #4. However, (1) to (16) may be regarded as an order in which the mobile stations 2 move into the cell of the base station 1.

Figure 10:
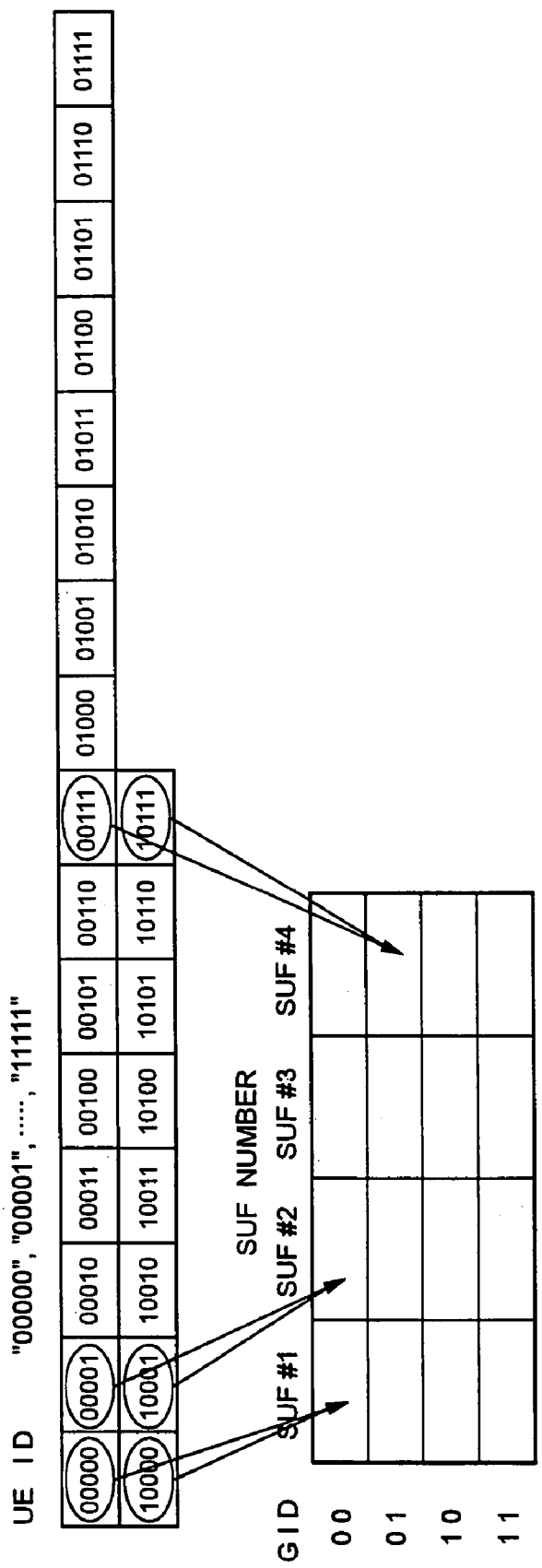
FIG. 10 is a schematic diagram for explaining duplicate allocation in the first embodiment of the present invention.

FIGS. 10 and 11 are schematic diagrams for explaining duplicated allocation in the first embodiment of the present invention. A box in the upper part of FIG. 10 indicates mobile stations to which mobile station IDs "00000" to "11111" are allocated, and a matrix in the lower part of the figure indicates allocation of group IDs and state update frame numbers.

The base station 1 allocates group IDs and status update frame numbers for suspend control to mobile stations in a connected state. However, in the case in which the number of mobile stations in the connected state increases and the group IDs and the status update frame numbers become insufficient, the base station 1 allocates the same group ID and state update number to a plurality of mobile stations. In this example, a mobile station ID "00000" and a mobile station ID "10000" are allocated to the same SUF#1 and group ID "00".

FIG. 11 represents an order of allocation at the time of duplication in the first embodiment of the present invention. As in the example shown in FIG. 9, after all resources are allocated, if connection of a mobile station is cancelled and a set of a group ID and a status update frame number becomes vacant, the set is allocated. Otherwise, first allocation and duplicated allocation are performed in the same manner as follows:

[(1), (2)]→[(3), (4)]→[(5), (6), (7), (8)]→[(9), (10), (11), (12), (13), (14), (15), (16)]→[(1), (2)]→ . . . .

Figure 12:
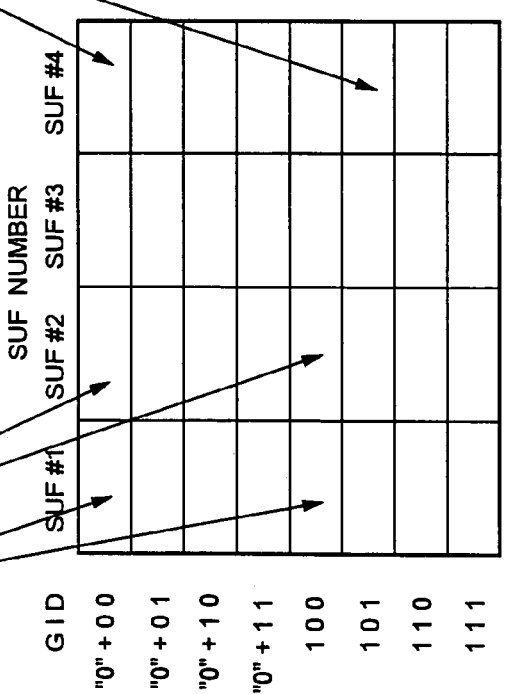
FIGS. 12A to 12C are diagrams showing an example of use of Valuable GID Flag 2 at the time of duplicate allocation in the first embodiment of the present invention.
Figure 13:
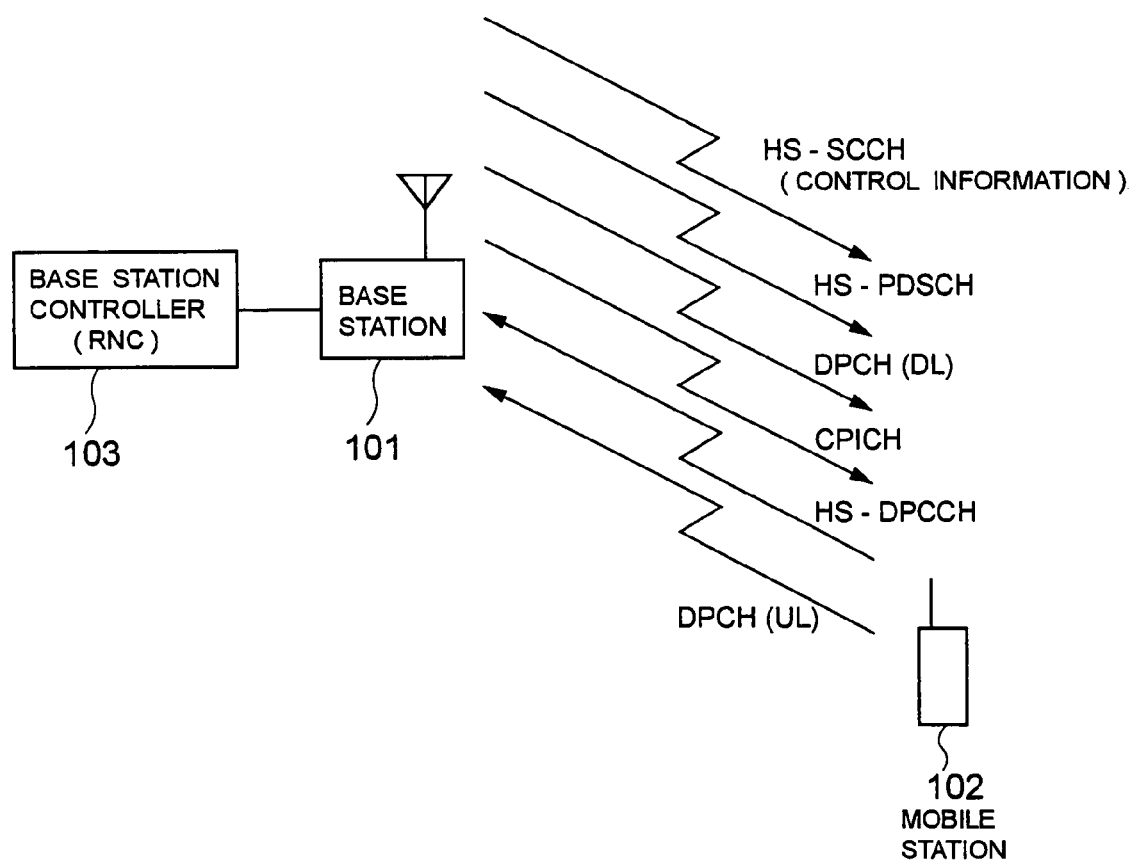
FIG. 13 is a block diagram showing a structure of a mobile radio communication system according to a conventional example.
Figure 14:
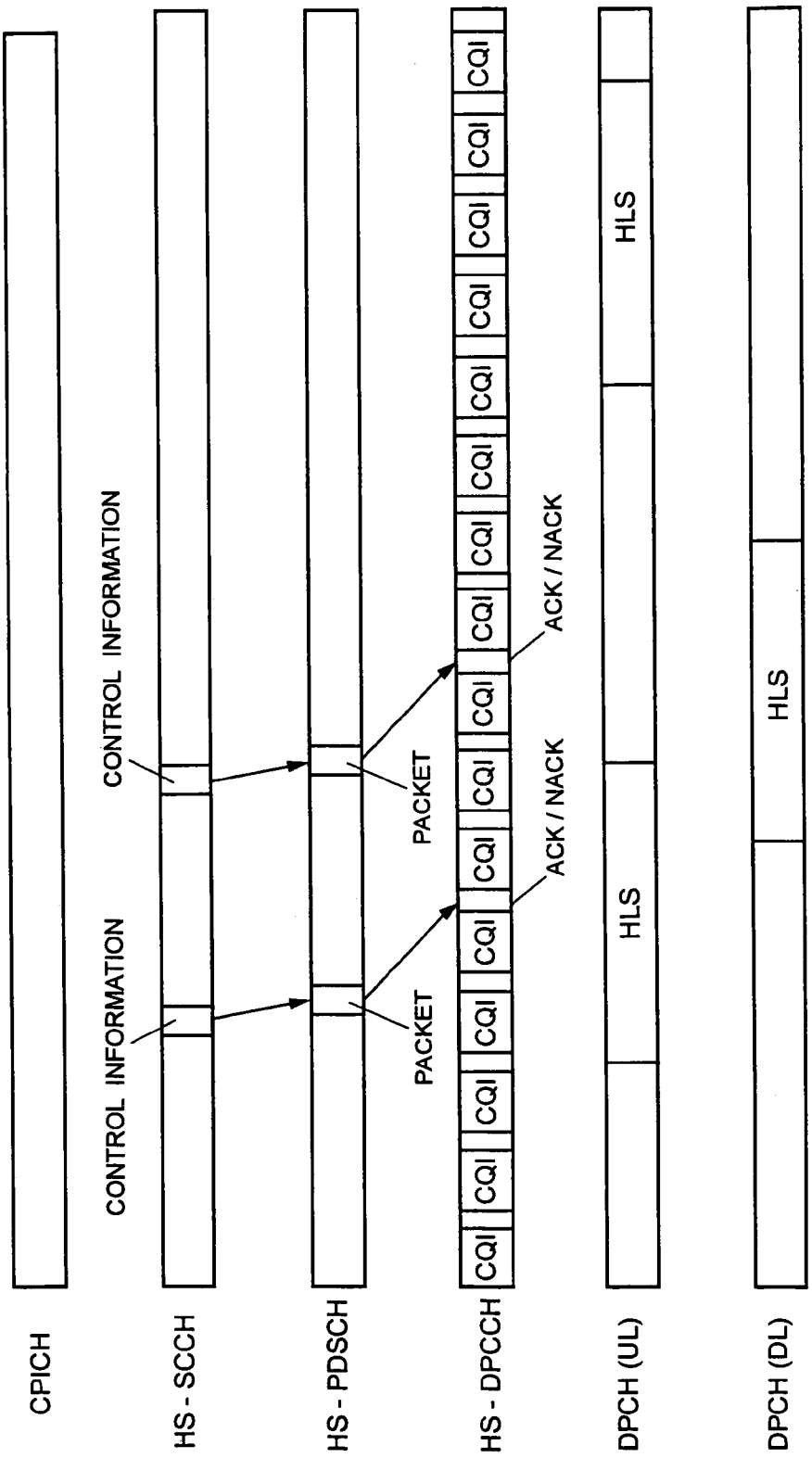
FIG. 14 is a diagram showing a flow of signals to be sent and received between a base station and a mobile station in the conventional example.

FIGS. 12A, 12B, and 12C show an example of use of the Variable ID Flag 2 (a flag specifying the number of bits used for one group ID in status update information in the case in which the number of group IDs is increased at the time of duplicate allocation of the group IDs) at the time of duplicate allocation.

In FIG. 12A, in the case in which group IDs and status update frame number become insufficient due to increase in the number of mobile stations in a connected state, a group ID consisting of two bits is changed to a three bit group ID, and the group ID is allocated. However, in the case in which group IDs and status update frame numbers become insufficient due to further increase in the number of mobile stations in the connected state, the same group ID and status update frame number are allocated to a plurality of mobile stations.

In this example, a mobile station ID "00000" is allocated to a group ID "00" of SUF#1. However, a mobile station ID "10000" is increased by one bit and allocated to "100" because group IDs become insufficient.

FIGS. 12B and 12C shows an example of use of the Variable ID Flag 2 at the time of such duplicate allocation. In FIG. 12B, since the Variable ID Flag 2 is "00" and is OFF, GID in status update information is designated by the initial number of bits of two. At this point, if the case of SUF#1 is assumed, a mobile station with a mobile station ID "00000" designated by a group ID "00" and a mobile station with a mobile station ID "10000" become Active.

On the other hand, in an example of FIG. 12C, since the Variable ID Flag 2 is "01", it is designated with three bits of "initial number of bits+one bit" in the status update information. Since a group ID is designated as "000", the mobile station with the mobile station ID "00000" becomes Active. However, the mobile station with a mobile station ID "10000" becomes Suspend.

As described above, in this embodiment, it becomes possible to combine a group ID and a status update frame number in a user ID for specifying respective mobile stations by using a temporarily allocated user ID and allocating group IDs to be used for the user ID temporarily. Therefore, it becomes possible to reduce the group ID in length with respect to the number of mobile stations, and it becomes possible to realize efficiency of air resources compared with the case in which an ID peculiar to a mobile station is used for notifying the mobile station of status update information.

Note that, in the present invention, it is also possible that a channel for sending status update information does not use an HS-SCCH for sending HSDPA control information and a dedicated control channel is set separately. In addition, in the present invention, as a transmission method of an active acknowledge signal, the active acknowledge signal may be sent using an HS-DPCCH or may be sent using other control channels.

Moreover, the present invention can be applied not only to an HSDPA but also to a DCH (Dedicated Channel) used for transmission of user data on a bi-directional channel and an FACH (Forward Access Channel) used for transmission of control information and user data on a downlink shared channel.

In other words, the present invention can be applied to packet communication other than the high-speed packet communication such as the HSDPA service and is applicable to any mobile radio communication apparatus as long as the mobile radio communication apparatus performs control or the like by specifying a group of mobile stations other than the suspend control. In addition, the present invention is not limited to the above-described embodiments, and it is also possible to use the embodiment in combination.

As described above, the present invention has an effect that, in a mobile radio communication system for performing transmission and reception of control information and data between a base station and a mobile station, the base station temporarily allocates user identification information, which consists of a code sequence and timing information for notifying the code sequence to the mobile station, to the mobile station, whereby group identification information can be reduced in length with respect to the number of mobile stations, and efficiency of air resources can be realized.

What is claimed is:

1. A mobile radio communication system which performs transmission and reception of control information and data between a base station and mobile stations, the mobile radio communication system comprising, in said base station, means for temporarily allocating, over the shared channel, user identification information to said mobile stations, said user identification information comprising a group identification code sequence that consists of fewer bits than a user identification of the mobile stations and timing information for notifying the mobile stations of the code sequence, wherein said base station allocates said user identification information to said mobile stations when said mobile stations move into a cell managed by said base station itself, wherein the user identification information is allocated to said mobile stations in a predetermined order set in advance.

2. A mobile radio communication system according to claim 1,
wherein said mobile radio communication system comprises, in the base station, means which notifies said mobile stations of transmission/reception status update information, which indicates update of a status concerning whether or not reception of the packet in said mobile stations is possible,
executes suspend control for setting a connection status to one of an active state in which reception of the packet is possible in said mobile stations and a suspend state in which reception of packet is impossible in said mobile stations on the basis of the transmission/reception status Update information, and
allocates the user identification information of mobile stations to be objects of the suspend control to the transmission/reception status update information.

3. A mobile radio communication system according to claim 1, wherein said predetermined order is an order in which differences of codes and timing among the user identification information increases.

4. A mobile radio communication system according to claim 1, wherein, when user identification information, which is placed in a later stage of user identification information of said mobile stations themselves in notification information consisting of plural pieces of the user identification information, is shown earlier than the user identification information of said mobile stations themselves by said base station, said mobile stations neglect user identification information after the user identification information.

5. A mobile radio communication system according to claim 1, wherein the code sequence includes a specific code indicating that there is no code sequence after the timing in notification information of the code sequence, and said mobile radio communication system allocates the code sequence to said mobile stations preferentially from a code sequence with a largest intercode distance to the specific signal.

6. A mobile radio communication system according to claim 5, wherein the specific signal is sent continuously from a position where the specific signal is manifested first in the notification information.

7. A mobile radio communication system according to claim 1, wherein said base station notifies said mobile stations of information at timing of the user identification information to be notified to said mobile stations and at fixed timing corresponding to said mobile stations in notification information of the user identification information.

8. A mobile radio communication system according to claim 7, wherein said mobile radio communication system performs display of presence or absence of call for said mobile stations according to ON/OFF information.

9. A mobile radio communication system according to claim 1, wherein, when it has become impossible to give the user identification information to mobile stations in a cell managed by said base station, said mobile radio communication system allocates the user identification information to said mobile stations duplicately.

10. A mobile radio communication system according to claim 1, wherein said mobile radio communication system notifies first flag information specifying the number of bits to be used in the user identification information from said base station to said mobile stations, and the number of bits of the user identification information is made variable.

11. A mobile radio communication system according to claim 1, wherein said mobile radio communication system notifies said respective mobile stations of the user identification information in the case in which the number of pieces of the user identification information is equal to or smaller than a predetermined number set in advance, and notifies information specifying all of said mobile stations when the number of pieces of user identification information is equal to or larger than the predetermined number.

12. A mobile radio communication system according to claim 1, wherein said mobile radio communication system notifies, using second flag information, whether or not the number of pieces of the user identification information to be notified is larger than a number defined in advance.

13. A base station which performs transmission and reception of control information and data between the base station and mobile stations, the base station comprising means for temporarily allocating, over a shared channel, user identification information to the mobile stations, said user identification information comprising a group identification code sequence that consists of fewer bits than a user identification of the mobile stations and timing information for notifying the mobile stations of the code sequence.

14. A base station according to claim 13, wherein said base station allocates said user identification information to said mobile stations when said mobile stations move into a cell managed by said base station itself.

15. A base station according to claim 13,
wherein said base station comprises means which notifies said mobile stations of transmission/reception status update information indicating a status concerning whether or not reception of the packet in said mobile stations is possible,
executes suspend control for setting a connection status to one of an active state in which reception of the packet is possible in said mobile stations and a suspend state in which reception of packet is impossible in said mobile stations on the basis of the transmission/reception status update information, and
allocates the user identification information of mobile stations to be an object of the suspend control to the transmission/reception status update information.

16. A mobile radio communication method which performs transmission and reception of control information and data between a base station and mobile stations,
wherein said base station temporarily allocates, over a shared channel, user identification information to said mobile stations, said user identification information comprising a group identification code sequence that consists of fewer bits than a user identification of the mobile stations and timing information for notifying the mobile stations of the code sequence.

17. A mobile radio communication method according to claim 16, wherein said base station allocates said user identification information to said mobile stations when said mobile stations move into a cell managed by said base station.

18. A mobile radio communication method according to claim 16,
wherein said mobile radio communication method notifies transmission/reception status update information, which indicates update of a status concerning whether or not reception of the packet in said mobile stations is possible, to said mobile stations from said base station,
executes suspend control for setting a connection status to one of an active state in which reception of the packet is possible in said mobile stations and a suspend state in which reception of packet is impossible in said mobile stations on the basis of the transmission/reception status update information, and allocates the user identification information of mobile stations to be an object of the suspend control to the transmission/reception status update information.

19. A base station which performs transmission and reception of control information and data between the base station and mobile stations, the base station comprising means for temporarily allocating, over a shared channel, user identification information to said mobile stations, said user identification information comprising a group identification code sequence that consists of fewer bits than a user identification of the mobile stations and timing information for notifying the mobile stations of the code sequence, wherein said base station allocates said user identification information to said mobile stations when said mobile stations move into a cell managed by said base station itself, and said user identification information is allocated to said mobile stations in a predetermined order set in advance.

20. A base station according to claim 19, wherein said predetermined order is an order in which differences of codes and timing among said user identification information increases.

21. A base station according to claim 19, wherein said code sequence includes a specific code indicating that there is no code sequence after the timing in notification information of said code sequence, and said base station allocates said code sequence to said mobile stations preferentially from a code sequence with a largest intercode distance to the specific code.

22. A base station according to claim 21, wherein said specific code is sent continuously from a position where the specific signal is manifested first in said notification information.

23. A base station according to claim 19, wherein said base station notifies said mobile stations of information at timing of the user identification information to be notified to said mobile stations and at fixed timing corresponding to said mobile stations in notification information of said user identification information.

24. A base station according to claim 23, wherein said base station performs display of presence or absence of call for said mobile stations according to ON/OFF information.

25. A base station according to claim 19, wherein, when it has become impossible to give said user identification information to mobile stations in a cell managed by said base station, said base station allocates said user identification information to said mobile stations duplicately.

26. A base station according to claim 19, wherein said base station notifies first flag information specifying the number of bits to be used in said user identification information from said base station to said mobile stations, and the number of bits of said user identification information is made variable.

27. A base station according to claim 19, wherein said base station notifies said respective mobile stations of said user identification information in the case in which the number of pieces of said user identification information is equal to or smaller than a predetermined number set in advance, and notifies information specifying all said mobile stations when the number of pieces of user identification information is equal to or larger than the predetermined number.

28. A base station according to claim 19, wherein said base station notifies, using second flag information, whether the number of pieces of said user identification information to be notified is larger than a number defined in advance.

29. A base station which performs transmission and reception of control information and data between the base station and mobile stations, the base station comprising means for temporarily allocating, over a shared channel, user identification information to said mobile stations, said user identification information comprising a group identification code sequence that consists of fewer bits than a user identification of the mobile stations and timing information for notifying the mobile stations of the code sequence, wherein said mobile station comprises means which notifies said mobile stations of transmission/reception status update information indicating a status concerning whether or not reception of the packet in said mobile stations is possible, executes suspend control for setting a connection status to one of an active state in which reception of the packet is possible in said mobile stations and a suspend state in which reception of packet is impossible in said mobile stations on the basis of the transmission/reception status update information, and allocates said user identification information of mobile stations to be an object of the suspend control to the transmission/reception status update information, and the user identification information is allocated to said mobile stations in a predetermined order set in advance.

30. A base station according to claim 29, wherein said predetermined order is an order in which differences of codes and timing among the user identification information increases.

31. A base station according to claim 29, wherein said code sequence includes a specific code indicating that there is no code sequence after the timing in notification information of said code sequence, and said base station allocates said code sequence to said mobile stations preferentially from said user identification information with a largest intercode distance to said specific code.

32. A base station according to claim 31, wherein said specific code is sent continuously from a position where the specific code is manifested first in said notification information.

33. A base station according to claim 29, wherein said base station notifies said mobile stations of information at timing of said user identification information to be notified to said mobile stations and at fixed timing corresponding to said mobile stations in notification information of said user identification information.

34. A base station according to claim 33, wherein said base station performs display of presence or absence of call for said mobile stations according to ON/OFF information.

35. A base station according to claim 29, wherein, when it has become impossible to give said user identification information to mobile stations in a cell managed by said base station, said base station allocates said user identification information to said mobile stations duplicately.

36. A base station according to claim 29, wherein said base station notifies first flag information specifying the number of bits to be used in said user identification information from said base station to said mobile stations, and the number of bits of said user identification information is made variable.

37. A base station according to claim 29, wherein said base station notifies said respective mobile stations of said user identification information in the case in which the number of pieces of said user identification information is equal to or smaller than a predetermined number set in advance, and notifies information specifying all of said mobile stations when the number of pieces of said user identification information is equal to or larger than said predetermined number.

38. A base station according to claim 29, wherein said base station notifies, using second flag information, whether the number of pieces of said user identification information to be notified is larger than a number defined in advance.

39. A base station which performs transmission and reception of control information and data between the base station and mobile stations, said base station comprising means for temporarily allocating, over a shared channel, user identification information to said mobile stations, said user identification information comprising a group identification code sequence that consists of fewer bits than a user identification of the mobile stations and timing information for notifying the mobile stations of the code sequence, wherein said base station allocates said user identification information to said mobile stations when said mobile stations move into a cell managed by said base station itself, said mobile station comprises means which notifies said mobile stations of transmission/reception status update information indicating a status concerning whether or not reception of the packet in said mobile stations is possible, executes suspend control for setting a connection status to one of an active state in which reception of said packet is possible in said mobile stations and a suspend state in which reception of packet is impossible in said mobile stations on the basis of said transmission/reception status update information, and allocates said user identification information of mobile stations to be an object of the suspend control to said transmission/reception status update information, and said user identification information is allocated to said mobile stations in a predetermined order set in advance.

40. A base station according to claim 39, wherein said predetermined order is an order in which differences of codes and timing among said user identification information increases.

41. A base station according to claim 39, wherein said code sequence includes a specific code indicating that there is no code sequence after the timing in notification information of said code sequence, and said base station allocates said code sequence to said mobile stations preferentially from said user identification information with a largest intercode distance to said specific code.

42. A base station according to claim 41, wherein said specific code is sent continuously from a position where said specific code is manifested first in the notification information.

43. A base station according to claim 39, wherein said base station notifies said mobile stations of information at timing of said user identification information to be notified to said mobile stations and at fixed timing corresponding to said mobile stations in notification information of said user identification information.

44. A base station according to claim 43, wherein said base station performs display of presence or absence of call for said mobile stations according to ON/OFF information.

45. A base station according to claim 39, wherein, when it has become impossible to give said user identification information to mobile stations in a cell managed by said base station, said base station allocates said user identification information to said mobile stations duplicately.

46. A base station according to claim 39, wherein said base station notifies first flag information specifying the number of bits to be used in said user identification information from said base station to said mobile stations, and the number of bits of said user identification information is made variable.

47. A base station according to claim 39, wherein said base station notifies said respective mobile stations of said user identification information in the case in which the number of pieces of said user identification information is equal to or smaller than a predetermined number set in advance, and notifies information specifying all of said mobile stations when said number of pieces user identification information is equal to or larger than said predetermined number.

48. A base station according to claim 39, wherein said base station notifies, using second flag information, whether the number of pieces of said user identification information to be notified is larger than a number defined in advance.

49. A mobile radio communication method which performs transmission and reception of control information and data between a base station and mobile stations, wherein said base station temporarily allocates, over a shared channel, user identification information to said mobile stations, said user identification information comprising a group identification code sequence that consists of fewer bits than a user identification of the mobile stations and timing information for notifying the mobile stations of the code sequence, said base station allocates said user identification information to said mobile stations when said mobile stations move into a cell managed by said base station, and said user identification information is allocated to said mobile stations in a predetermined order set in advance.

50. A mobile radio communication method according to claim 49, wherein said predetermined order is an order in which differences of codes and timing among said user identification information increases.

51. A mobile radio communication method according to claim 49, wherein, when user identification information, which is placed in a later stage of user identification information of said mobile stations themselves in notification information consisting of plural pieces of said user identification information, is shown earlier than said user identification information of said mobile stations themselves by said base station, said mobile stations neglect user identification information after said user identification information.

52. A mobile radio communication method according to claim 49, wherein said code sequence includes a specific code indicating that the there is no code sequence after the timing in notification information of the code sequence, and said mobile radio communication method allocates said code sequence to said mobile stations preferentially from said user identification information with a largest intercode distance to said specific code.

53. A mobile radio communication method according to claim 52, wherein said specific code is sent continuously from a position where said specific code is manifested first in the notification information.

54. A mobile radio communication method according to claim 49, wherein said base station notifies said mobile stations of information at timing of said user identification information to be notified to said mobile stations and at fixed timing corresponding to said mobile stations in notification information of said user identification information.

55. A mobile radio communication method according to claim 54, wherein said mobile radio communication method performs display of presence or absence of call for said mobile stations according to ON/OFF information.

56. A mobile radio communication system according to claim 49, wherein, when it has become impossible to give said user identification information to mobile stations in a cell managed by said base station, said mobile radio communication method allocates said user identification information to said mobile stations duplicately.

57. A mobile radio communication method according to claim 49, wherein said mobile radio communication method notifies first flag information specifying the number of bits to be used in said user identification information from said base station to said mobile stations, and the number of bits of said user identification information is made variable.

58. A mobile radio communication method according to claim 49, wherein said mobile radio communication method notifies said respective mobile stations of said user identification information in the case in which the number of pieces of the user identification information is equal to or smaller than a predetermined number set in advance, and notifies information specifying all of said mobile stations when said number of pieces of user identification information is equal to or larger than said predetermined number.

59. A mobile radio communication method according to claim 49, wherein said mobile radio communication method notifies, using second flag information, whether said number of pieces of said user identification information to be notified is larger than a number defined in advance.

60. A mobile radio communication method which performs transmission and reception of control information and data between a base station and mobile stations,
wherein said base station temporarily allocates, over a shared channel, user identification information to said mobile stations, said user identification information comprising a group identification code sequence that consists of fewer bits than a user identification of the mobile stations and timing information for notifying the mobile stations of the code sequence,
said mobile radio communication method notifies transmission/reception status update information, which indicates update of a status concerning whether or not reception of the packet in said mobile stations is possible, from said base station to said mobile stations,
executes suspend control for setting a connection status to one of an active state in which reception of said packet is possible in said mobile stations and a suspend state in which reception of packet is impossible in said mobile stations on the basis of said transmission/reception status update information, and
allocates said user identification information of mobile stations to be objects of said suspend control to said transmission/reception status update information, and
said user identification information is allocated to said mobile stations in a predetermined order set in advance.

61. A mobile radio communication method according to claim 60, wherein said predetermined order is an order in which differences of codes and timing among said user identification information increases.

62. A mobile radio communication method according to claim 60, wherein, when user identification information, which is placed in a later stage of user identification information of said mobile stations themselves in notification information consisting of plural pieces of said user identification information, is shown earlier than said user identification information of said mobile stations themselves by said base station, said mobile stations neglect user identification information after said user identification information.

63. A mobile radio communication method according to claim 60, wherein said code sequence includes a specific code indicating that there is no code sequence after the timing in notification information of said code sequence, and said mobile radio communication method allocates said code sequence to said mobile stations preferentially from said user identification information with a largest intercode distance to said specific code.

64. A mobile radio communication method according to claim 63, wherein said specific code is sent continuously from a position where said specific code is manifested first in the notification information.

65. A mobile radio communication method according to claim 60, wherein said base station notifies said mobile stations of information at timing of said user identification information to be notified to said mobile stations and at fixed timing corresponding to said mobile stations in notification information of said user identification information.

66. A mobile radio communication method according to claim 65, wherein said mobile radio communication method performs display of presence or absence of call for said mobile stations according to ON/OFF information.

67. A mobile radio communication method according to claim 60, wherein, when it has become impossible to give said user identification information to mobile stations in a cell managed by said base station, said mobile radio communication method allocates said user identification information to said mobile stations duplicately.

68. A mobile radio communication method according to claim 60, wherein said mobile radio communication method notifies first flag information specifying the number of bits to be used in said user identification information from said base station to said mobile stations, and the number of bits of said user identification information is made variable.

69. A mobile radio communication method according to claim 60, wherein said mobile radio communication method notifies said respective mobile stations of said user identification information in the case in which the number of pieces of the user identification information is equal to or smaller than a predetermined number set in advance, and notifies information specifying all of said mobile stations when said number of pieces of user identification information is equal to or larger than said predetermined number.

70. A mobile radio communication method according to claim 60, wherein said mobile radio communication method notifies, using second flag information, whether said number of pieces of said user identification information to be notified is larger than a number defined in advance.

71. A mobile radio communication method which performs transmission and reception of control information and data between a base station and mobile stations,
wherein said base station temporarily allocates, over a shared channel, user identification information to said mobile stations, said user identification information comprising a group identification code sequence that consists of fewer bits than a user identification of the mobile stations and timing information for notifying the mobile stations of the code sequence,
said base station allocates the user identification information to said mobile stations when said mobile stations move into a cell managed by said base station itself,
said mobile radio communication method notifies transmission/reception status update information, which indicates update of a status concerning whether or not reception of the packet in said mobile stations is possible, from said base station to said mobile stations, executes suspend control for setting a connection status to one of an active state in which reception of said packet is possible in said mobile stations and a suspend state in which reception of packet is impossible in said mobile stations on the basis of said transmission/reception status update information, and allocates said user identification information of mobile stations to be objects of said suspend control to said transmission/reception status update information, and said user identification information is allocated to said mobile stations in a predetermined order set in advance.

72. A mobile radio communication method according to claim 71, wherein said predetermined order is an order in which differences of codes and timing among said user identification information increases.

73. A mobile radio communication method according to claim 71, wherein, when user identification information, which is placed in a later stage of user identification information of said mobile stations themselves in notification information consisting of plural pieces of said user identification information, is shown earlier than said user identification information of said mobile stations themselves by said base station, said mobile stations neglect user identification information after said user identification information.

74. A mobile radio communication method according to claim 71, wherein said code sequence includes a specific code indicating that there is no code sequence after the timing in notification information of said code sequence, and said mobile radio communication method allocates said code sequence to said mobile stations preferentially from said user identification information with a largest intercode distance to said specific code.

75. A mobile radio communication method according to claim 74, wherein said specific code is sent continuously from a position where said specific code is manifested first in the notification information.

76. A mobile radio communication method according to claim 71, wherein said base station notifies said mobile stations of information at timing of said user identification information to be notified to said mobile stations and at fixed timing corresponding to said mobile stations in notification information of said user identification information.

77. A mobile radio communication method according to claim 76, wherein said mobile radio communication method performs display of presence or absence of call for said mobile stations according to ON/OFF information.

78. A mobile radio communication method according to claim 71, wherein, when it has become impossible to give said user identification information to mobile stations in a cell managed by said base station, said mobile radio communication method allocates said user identification information to said mobile stations duplicately.

79. A mobile radio communication method according to claim 71, wherein said mobile radio communication method notifies first flag information specifying the number of bits to be used in said user identification information from said base station to said mobile stations, and the number of bits of said user identification information is made variable.

80. A mobile radio communication method according to claim 71, wherein said mobile radio communication method notifies said respective mobile stations of said user identification information in the case in which the number of pieces of the user identification information is equal to or smaller than a predetermined number set in advance, and notifies information specifying all of said mobile stations when said number of pieces of user identification information is equal to or larger than said predetermined number.

81. A mobile radio communication method according to claim 71, wherein said mobile radio communication method notifies, using second flag information, whether said number of pieces of said user identification information to be notified is larger than a number defined in advance.

* * * * *